118,029

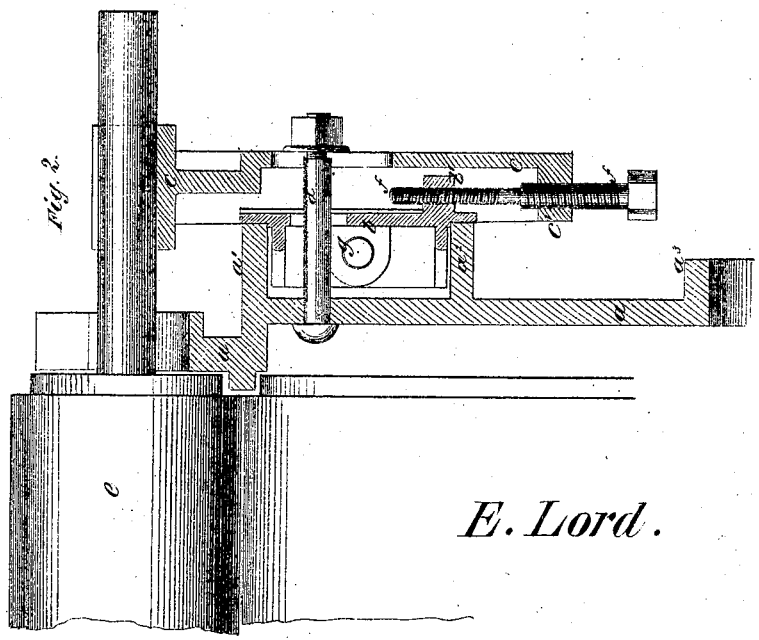
E. Lord.
118029   Screw for adjusting Card Rollers.
PATENTED AUG 15 1871
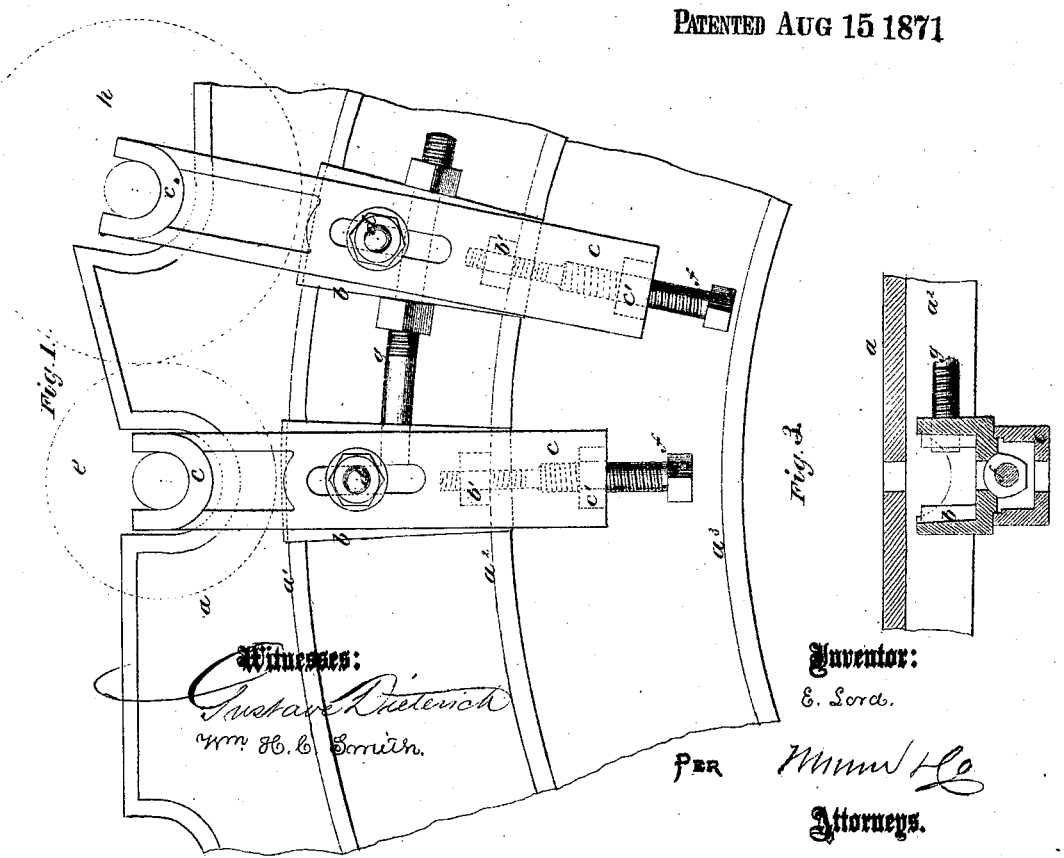
Witnesses:
Gustave Dieterich
Wm. H. C. Smith.
Inventor:
E. Lord.
PER Munn & Co
Attorneys.

UNITED STATES PATENT OFFICE.

EDWARD LORD, OF TODMORDEN, ENGLAND.

IMPROVEMENT IN MECHANISMS FOR ADJUSTING THE ROLLERS OF CARDING-MACHINES.

Specification forming part of Letters Patent No. 118,029, dated August 15, 1871.

*To all whom it may concern:*

Be it known that I, EDWARD LORD, of Todmorden, in the county of York, England, machine-maker, have invented certain new and useful Improvements in the Means of Regulating the Position of Card-Rollers and other articles requiring accurate adjustment; and I hereby declare the following to be a full, clear, and exact description thereof, reference being had to the annexed drawing forming part of this specification.

My invention pertains to an improved construction and arrangement of parts, whereby the position of the bearings of rollers working in combination with the main cylinder of a carding-engine or of other rollers may be adjusted or regulated with facility and accuracy.

In applying my invention to the working and clearing-rollers of carding-engines the roller-bearing fits between ribs cast on the outer side of a plate, the inner part of which fits between ribs cast on the bend of the carding-engine, the bearing, the plate, and the bend being secured together by a bolt and nut. The roller is adjusted by a right-and-left-handed regulating-screw, one part of which is screwed into a projection from the bearing and the other part is screwed into the plate; consequently, when the regulating-screw is turned partly around the bearing is moved to and fro in the plate. My invention may be modified by making the regulating-screw with a coarse and a fine thread.

Figure 1 represents an end view of part of a carding-engine to which my improvements are applied. Fig. 2 is a vertical section, and Fig. 3 a horizontal section of one of my improved bearings.

$a$ is part of the bend of a carding-engine, which is provided with the three segmental ribs, $a^1$, $a^2$, and $a^3$. Between the ribs $a^1$ and $a^2$ are fitted the segmental plates $b$, which are provided with small ribs to guide the roller-bearings $c$, the bearing $c$, the plate $b$, and the bend $a$ being united together by the bolt $d$, the nut of which, when tightened, secures the clearing-roller $e$ in its place.

To the inner side of the bearing $c$ is cast a projection, $c'$, and to the outside of the plate $b$ is cast the projection $b'$. The regulating-screw $f$ is made with a right-and-left-handed thread, one thread passing through a tapped hole in the projection $b'$ and the other through the projection $c'$. When it is necessary to adjust the position of the roller $e$ the nut of the bolt $d$ is slackened and the regulating-screw $f$ is turned partly around, either in one direction or the other, to move the roller $e$ either nearer to or further from the main cylinder, which is shown partly in Fig. 2. As the plate $b$ is held between the ribs $a^1$ and $a^2$, it is evident that in turning the regulating-screw $f$ partly around the bearing $c$ is moved from or toward the center of the main cylinder. The bearing of the working-roller $h$ is very similar to that above described, the only difference being that the position of this bearing must be regulated laterally in addition to its motion to and from the center of the main cylinder. This lateral motion is given by the nuts on the segmental screw $g$, one end of which is screwed into the plate $b$ of the bearing of the roller $e$, and the other end passes through a recess in the corresponding plate of the bearing of the roller $h$.

The regulating-screw for the bearing of the roller $h$ is made partly with a coarse thread and partly a fine thread. When this regulating-screw is turned partly around the motion imparted to the bearing $c$ is equal to the difference between the two pitches of the threads.

What I claim is—

The slotted bearing $c\ c'$, ribbed plate $b\ b'$, right-and-left-hand screw $f$, bolt $d$, and bend $a\ a^1\ a^2\ a^3$, all constructed and arranged as shown and described.

In testimony whereof I have hereunto set my hand before two subscribing witnesses.

EDW. LORD.

Witnesses:
   H. B. BARLOW,
   H. B. BARLOW, Jr.